United States Patent
Karpoor et al.

(10) Patent No.: US 9,615,290 B1
(45) Date of Patent: Apr. 4, 2017

(54) METHOD AND APPARATUS FOR DETECTING A TYPE OF INTERFERENCE IN A COMMUNICATION SYSTEM

(71) Applicant: MOTOROLA SOLUTIONS, INC., Schaumburg, IL (US)

(72) Inventors: Sanjay Karpoor, Buffalo Grove, IL (US); Mark Haney, Huntley, IL (US); Badarinath Patibandla, Schaumburg, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/044,606

(22) Filed: Feb. 16, 2016

(51) Int. Cl.
H04B 1/00 (2006.01)
H04W 28/04 (2009.01)
H04W 24/02 (2009.01)

(52) U.S. Cl.
CPC ......... *H04W 28/048* (2013.01); *H04W 24/02* (2013.01)

(58) Field of Classification Search
CPC ..... H04W 16/28; H04W 72/00; H04W 88/02; H04W 88/08; H04W 52/286
USPC ........................................................ 455/63.1
See application file for complete search history.

(56) References Cited

U.S. PATENT DOCUMENTS

2014/0146756 A1* 5/2014 Sahin .................... H04L 1/0025
370/329
2014/0355508 A1* 12/2014 Anchan ................... H04W 4/10
370/312

FOREIGN PATENT DOCUMENTS

EP 1217780 A2 6/2002

* cited by examiner

*Primary Examiner* — Ajibola Akinyemi

(57) ABSTRACT a method and apparatus for detecting interference within a communication system is provided herein. During operation, a base station will determine whether the interference is caused by in-system excessive collisions (e.g. multiple simultaneous registration and/or call requests). An appropriate mitigation technique will be applied by the base station based on a type of interference detected.

7 Claims, 4 Drawing Sheets

ETSI DMR CONTROL DATA BURST STRUCTURE FOR
REGISTRATION/CALL REQUEST MESSAGE

METHOD AND APPARATUS FOR DETECTING A TYPE OF INTERFERENCE IN A COMMUNICATION SYSTEM

FIELD OF THE INVENTION

The present invention generally relates to interference detection, and more particularly to a method and apparatus for detecting a type of interference within a communication system so that an appropriate interference mitigation technique can be performed.

BACKGROUND OF THE INVENTION

Oftentimes a communication system will experience interference that hinders communications between devices. There are generally two types of interference that a communication system may experience: in-system collisions; and random interference from one or multiple out-of-system transmissions. For example, consider a major emergency where many first responders are on scene from various agencies and attempting to communicate simultaneously. Such a scenario may overload a communication system with random interference from multiple transmissions and prevent communications among devices. Another scenario that may prevent communications among devices is when too many devices from a system attempt to simultaneously register with a communication system. For example, when many subscriber units within a communication system attempt to simultaneously register/request service on a wireless system, the simultaneous requests may collide, causing interference.

Oftentimes the best mitigation for interference is dependent upon what is causing the interference. For example, a system experiencing random interference may mitigate interference by "rolling" a control channel (i.e., changing the frequency being used by the control channel). Interference caused by multiple simultaneous registration or call requests (collisions) may be mitigated by detection and regulation of registration/call requests in an adaptive manner.

As is evident, it is beneficial to know what is causing the interference so that an appropriate mitigation technique may be chosen to reduce the interference. Therefore, a need exists for a method and apparatus for detecting interference within a communication system.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above mentioned need, a method and apparatus for detecting interference within a communication system is provided herein. During operation, a base station will determine whether the interference is caused by in-system excessive collisions (e.g. multiple simultaneous registration/call requests). An appropriate mitigation technique will be applied by the base station based on a type of interference detected.

More particularly, there are certain common portions or common fields of over-the-air transmissions shared among all registration/call requests. At the receiving base station, typically, if a signal is 6 dB+ greater than all other simultaneously-transmitted signals, the base station successfully decodes the strongest signal. However, if multiple transmissions are within +/−6 dB of each other the base station won't be able to decode any non-common portions of the signal.

During operation, the base station determines if any common portions of the signal within, for example, a registration request (e.g., sync or slot type) can be decoded. The common portions of the signal transmitted by all registering devices will add constructively (as long as the propagation delay difference is within certain limits). The non-common portions of the signal (e.g., subscriber unique address/data payload) will most likely be corrupted during collisions since it will destructively interfere. If a base station can consistently decode common portions of a registration request, but is unable to consistently decode the non-common portions of the registration/call request, then it can be assumed that the interference is caused by excessive simultaneous registration/call requests being made (in-system collisions) and an appropriate mitigation technique may be applied.

Figure 1:
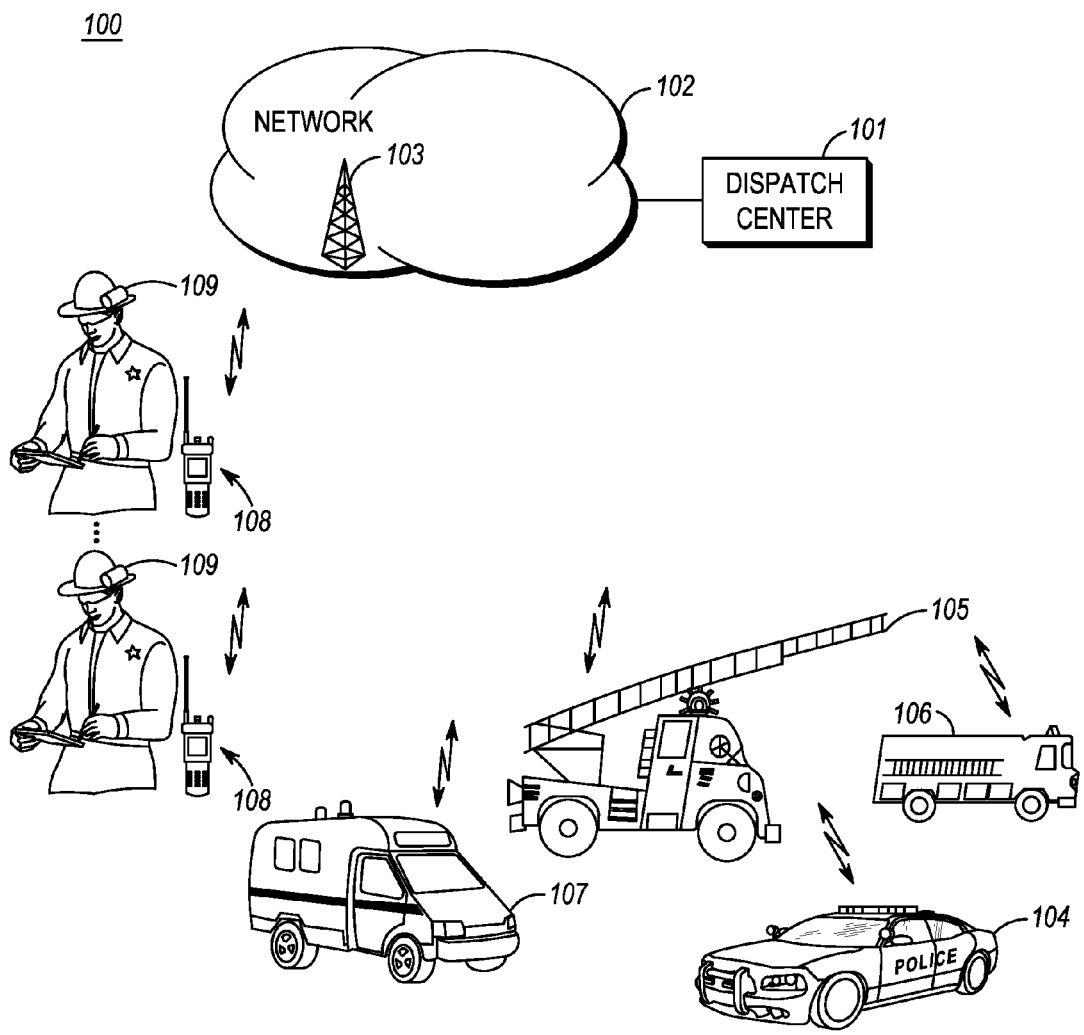
FIG. 1 illustrates a general operating environment for the present invention.

Turning now to the drawings wherein like numerals designate like components, FIG. 1 is a block diagram showing a general operational environment of communication system 100, according to one embodiment of the present invention. As shown in FIG. 1 a plurality of public-safety vehicles 104-107, officers 109 and devices 108 are in communication with dispatch center 101 through base station 103 and intervening network 102.

Public-safety vehicles 104-107 may comprise such vehicles as rescue vehicles, ladder trucks, ambulances, police cars, fire engines, . . . , etc. Each vehicle may be equipped with communication equipment that allows communication over network 102. Devices 108 can be any portable electronic device including but not limited to a standalone display or monitor, a handheld computer, a tablet computer, a mobile phone, a police radio, a media player, a personal digital assistant (PDA), a GPS receiver, or the like, including a combination of two or more of these items. Oftentimes, any communication unit attempting to communicate with base station 103 is commonly referred to as simply a "subscriber unit".

Network 102 may comprise one of any number of over-the-air or wired networks. For example network 102 may comprise a private 802.11 network set up by a building operator, a next-generation cellular communications network operated by a cellular service provider, or any public-safety network such as an APCO 25 network. Network 102 usually comprises several base stations 103 (only one shown). Base stations 103 can receive information (either control or media, e.g., data, voice (audio), video, etc.) in a signal from vehicles 104-107 and devices 108. Base stations 103 can also transmit information in signals to one or more vehicles 104-107 and devices 108.

As discussed above, oftentimes a public-safety incident will over tax any network handling the incident. For example, due to a large number of public-safety vehicles and personnel at, for example, a large fire, base station 103 handling the already-registered devices may be overloaded. Additionally, base station 103 may become overloaded because a large volume of devices are attempting to register simultaneously.

In order to address this issue, base station 103 will take steps to mitigate any interference detected. As discussed above, the technique used to mitigate the interference will depend on a cause of the detected interference (e.g., whether or not the interference is caused by multiple simultaneous registration/call request attempts or not).

Detecting if the Interference is Caused by Multiple Simultaneous Registration/Call Requests When a subscriber unit first attempts to access network 102 it must register itself with network 102. Registration requires the subscriber unit to transmit a "registration request" message to base station 103. A portion of the registration request message comprises information that is common (common information) among all devices attempting to register with network 102, while another portion of the registration request comprises information that is not common (non-common information that is unique to a particular subscriber unit). Thus, in every registration request to a particular base station, there is similar information transmitted by every subscriber unit as well as non-similar information that is unique to a particular subscriber unit. This is illustrated in FIG. 2.

Figure 2:
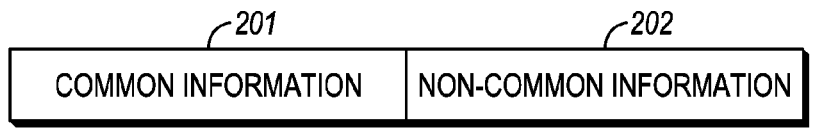
FIG. 2 illustrates a message having a common and a non-common portion.

As shown in FIG. 2, registration message 200 comprises a common portion 201 and a non-common portion 202. When multiple transmitters attempt to register simultaneously, common portion 201 will constructively interfere, while non-common portion will destructively interfere. This is because all subscriber units transmitting the common portion will transmit the same information, while those same units transmitting the non-common portion will be transmitting substantially different information.

Figure 3:
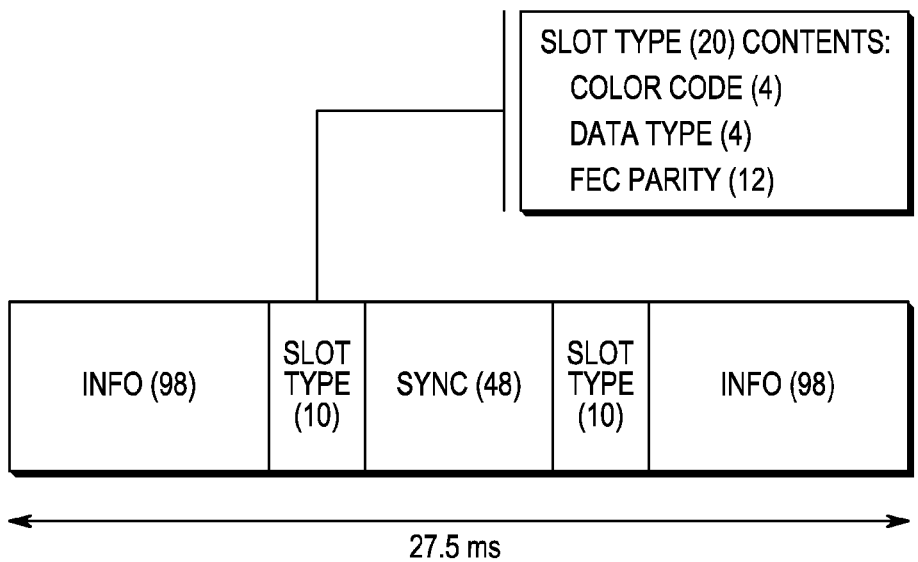
FIG. 3 illustrates a message having a common and a non-common portion.
Figure 4:
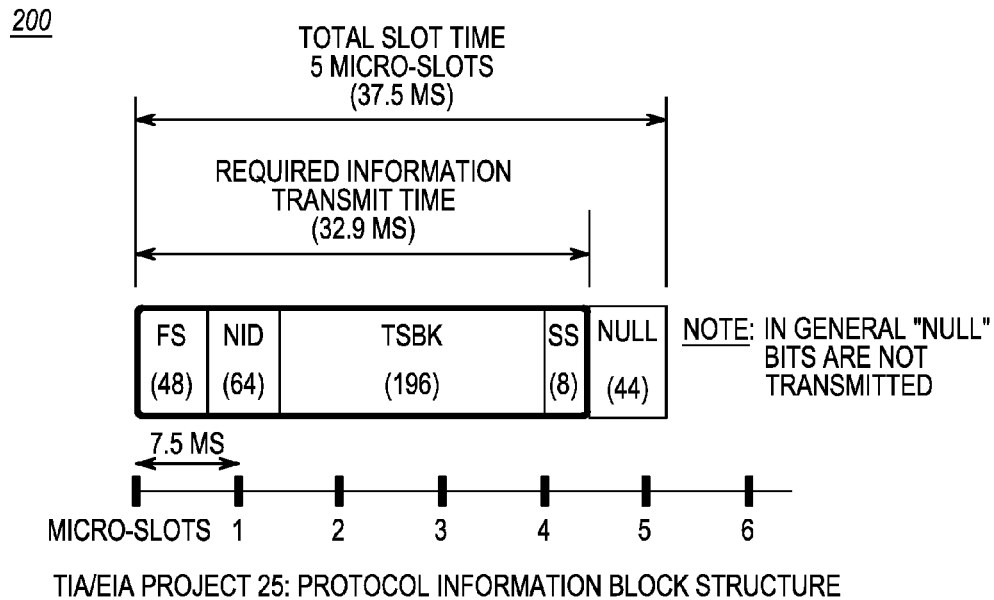
FIG. 4 illustrates a message having a common and a non-common portion.

FIG. 3 through FIG. 4 provide a more-detailed depiction of registration/call request messages for various communication system protocols. FIG. 3 illustrates a registration/call request message using the ETSI DMR communication system protocol. The common portion 201 comprises fields such as Sync (48 bits) and Slot Type (20 bits). The non-common portion 202 comprises such fields as Info (196 bits).

The Sync common portion of the registration/call request (Sync pattern) comprises a sequence of 48 bits in the DMR protocol used to achieve frame synchronization at the receiver. Frame synchronization is the initial step to receiving a message and shall be achieved before the other fields can be extracted, parsed and interpreted. Sync information element is the same for all subscriber units that initiate registration or call request message.

The Slot Type (20 bits) common portion is comprised of Color Code (4 bits), Data Type (4 bits) and Forward Error Correction (FEC) parity (12 bits). FEC is computed over the Color Code and Data Type information.

The Color Code (4 bits) common portion in the DMR protocol is used to identify a site from where the registration/call request message is originated and provides a simple means of distinguishing overlapping sites, in order to detect co-channel interference. The Color Code information element is the same when subscriber units initiate registration or call request message at a site in a DMR system.

The Data Type (4 bits) common portion in DMR protocol is used to identify type of burst (control, voice header, data header, etc.). All registration and call request messages share the same Data Type value.

The Info (196 bits) non-common portion is comprised of registration/call request information (80 bits), CRC (16 bits) and Forward Error Correction (100 bits). Registration/call request information contains subscriber unit identity along with other information. As subscriber unit identity is different for each subscriber unit in a system, the info (196 bits) in registration/call request message is different for each subscriber unit in a system.

FIG. 4 illustrates a registration message using the TIA/EIA Standard Project 25 communication system protocol. The common portion 201 comprises fields such as the 48-bit Frame Synchronization (FS) and the 64-bit Network Identifier (NID). The non-common portion 202 comprises such fields as the 196-bit Trunk Signaling Block (TSBK).

The Frame Synchronization common portion is a sequence of 48 bits in the TIA/EIA project 25 protocol which is used to achieve frame synchronization at the receiver. Frame synchronization is the initial step to receiving a message and shall be achieved before the other fields can be extracted, parsed and interpreted. Frame Sync information element will be same when multiple subscriber units initiate registration or call request message.

The Network Identifier (64 bits) common portion is comprised of Network Access Code (12 bits), Data Unit ID (4 bits) and Forward Error Correction (FEC) parity (48 bits). FEC is computed over the Network Access Code and Data unit ID information.

The Trunk Signaling Block (TSBK) (196 bits) non-common portion is comprised of registration/call request information (80 bits), CRC (16 bits) and Forward Error Correction (100 bits). Registration/call request information contains subscriber unit identity along with other information. As subscriber unit identity is different for each subscriber unit in a system, the TSBK (196 bits) in registration/call request message is different for each subscriber unit in a system.

As discussed above common portions of all simultaneously-transmitted registration/call requests will constructively interfere and the base station will successfully decode this portion of the combined transmissions (i.e., the combined, simultaneously-transmitted registration requests). However, non common fields of all simultaneously-transmitted registration/call requests will destructively interfere and the base station won't be able to decode this portion of the combined transmissions. Thus, because the common fields will constructively interfere, the base station will be able to decode this portion of the combined signal, but will be unable to decode the non-common fields of the combined signal. This will be used to identify whether or not any interference is caused by multiple devices attempting to simultaneously register with a base station.

Thus, during operation, the base station determines if any common signaling (e.g., sync, slot type) can be decoded and the non-common signaling (e.g., a payload) gets corrupted. If a base station can consistently decode the common signaling, but is unable to consistently decode the non-common signaling, then the base station assumes that the system interference is caused by excessive simultaneous registration requests being made.

Techniques for Mitigating Interference Caused by Multiple, Simultaneous Registration Request Messages being Received If it is determined that detected interference is caused by multiple, simultaneous registration and/or call request messages being received, base station 103 can perform some action on the outbound control channel to signal the subscriber units in order to regulate registration requests adaptively. Refer to U.S. patent application Ser. No. 14/264,821 "METHOD AND APPARATUS FOR RESPONDING TO A POTENTIAL MASS RANDOM ACCESS EVENT". In this patent application, it is proposed that the Base Station, upon detecting in-system collisions, announce on the outbound control channel to allow the inbound control channel access to a subset of Subscriber units at a time. The number of subscriber units in a subset is adaptively controlled (generally reduced) until collisions are not detected.

In another approach, upon detecting in-system collisions, the Base Station may signal the subscriber units to increase the random hold off time for registration/call requests.

Techniques for Mitigating Interference not Caused by Multiple, Simultaneous Registration Request Messages being Received If it is determined that detected interference is not caused by multiple, simultaneous registration request messages being received, base station 103 will most likely roll over the control channel to another frequency. In other words, the frequency used by the base station for transmitting control information will be changed.

Figure 5:
FIG. 5 is a block diagram of a base station.

FIG. 5 shows an exemplary block diagram of base station 103 of FIG. 2. As shown, base station 103 may include transmitter 501, receiver 502, and logic circuitry 503. In other implementations, base station 103 may include more, fewer, or different components.

Transmitter 501 and receiver 502 may be well known long-range and/or short-range transceivers that utilize a communication system protocol that has common and non-common signaling. For example, the communication-system protocol may comprise a next-generation cellular communications network operated by a cellular service provider, or any public-safety network such as an APCO 25 network or the FirstNet broadband network. Transmitter 501 and receiver 502 may also contain multiple transmitters and receivers, to support multiple communications protocols simultaneously.

Logic circuitry 503 comprises a digital signal processor (DSP), general purpose microprocessor, a programmable logic device, or application specific integrated circuit (ASIC) and is utilized/configured to determine a type of interference and take an appropriate interference-mitigation technique based on the type of interference. More specifically, logic circuitry determines if a common portion of any message can be properly decoded, while the non-common portion of the message cannot be decoded. If this is the case, then mitigation techniques that alleviate multiple simultaneous transmissions of a same message from multiple subscriber units will be applied.

The base station of FIG. 5 comprises at least a receiver receiving multiple, simultaneous transmissions from a plurality of subscriber units, logic circuitry determining that a common portion of the multiple, simultaneous transmissions can be decoded, while a non-common portion of the multiple, simultaneous transmissions cannot be decoded and applying an interference-mitigation technique that is based on whether the common portion of the multiple, simultaneous transmissions can be decoded, while the non-common portion of the multiple, simultaneous transmissions cannot be decoded.

As described above, the multiple, simultaneous transmissions may comprise multiple, simultaneous registration requests simultaneously transmitted by a plurality of subscriber units, while the common portion comprises a field from the simultaneous transmissions taken from a group consisting of a sync field, a slot-type field, a color code field, a data type field, a frame synchronization field, and a network identifier field. Additionally, the interference-mitigation technique may comprise using a transmitter to transmit instructions to the plurality of subscriber units that allow an inbound control channel access to a subset of the plurality of subscriber units, or adjusting a random hold-off timer of Subscriber Units.

Figure 6:
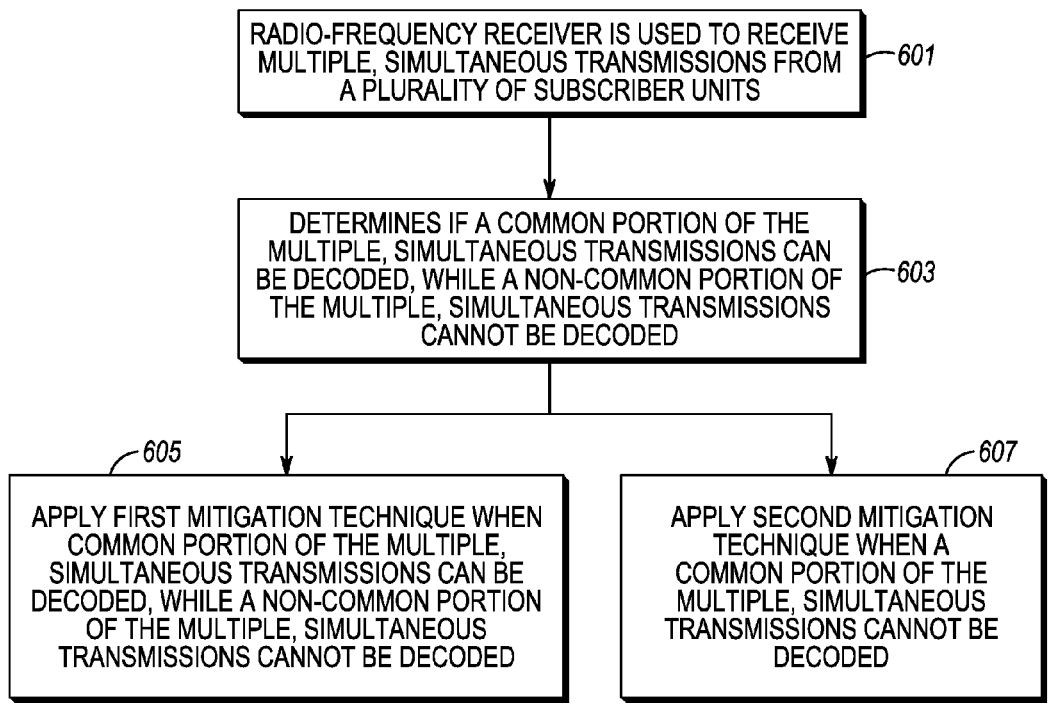
FIG. 6 is a flow chart showing operation of the base station of FIG. 5.

FIG. 6 is a flow chart showing operation of the base station of FIG. 5. The logic flow begins at step 601 where a radio-frequency receiver is used to receive multiple, simultaneous transmissions from a plurality of subscriber units. As discussed above, each transmission from the multiple, simultaneous transmissions may have a common portion and a non-common portion, with the common portion constructively interfering, and the non-common portion destructively interfering.

At step 603 logic circuitry 503 determines if a common portion of the multiple, simultaneous transmissions can be decoded, while a non-common portion of the multiple, simultaneous transmissions cannot be decoded. More particularly, logic circuitry 503 determines the decoding is successful if CRC check passes for each of the CRC protected common and/or non common portions. The decoding is unsuccessful if CRC check fails for each of the CRC protected common and/or non common portions. If one or more common portions are not CRC protected (e.g., Sync (48 bits), Color Code (4 bits), Data Type (4 bits)), then the logic circuitry applies other techniques such as comparing the decoded values with pre-determined/expected values or evaluating the number of errors corrected by the FEC decoder. If the decoded values match with the pre-determined/expected values or if the number of errors corrected is within the error correction capability of the FEC decoder, then the logic circuitry declares the successful decoding of the common portion. Similarly if one or more non-common portions are not CRC protected, then the logic circuitry applies other techniques such as evaluating the number of errors corrected by the FEC decoder. If the number of errors corrected is within the error correction capability of the FEC decoder, then the logic circuitry declares the successful decoding of the non-common portion. Or else the decoding of non-common portion is unsuccessful.

At step 605, logic circuitry 503 applies a first interference-mitigation technique when the common portion of the multiple, simultaneous transmissions can be decoded, and the non-common portion of the multiple, simultaneous transmissions cannot be decoded, and at step 607 logic circuitry 503 applies a second interference-mitigation technique when the common portion of the multiple, simultaneous transmissions cannot be decoded. In another embodiment of this invention, at step 605, logic circuitry 503 applies a first interference mitigation technique when the count of common portion of the multiple, simultaneous transmissions that can be decoded and the non-common portion of the multiple, simultaneous transmissions that cannot be decoded, over a time duration, exceeds a Threshold1 (E.g., time duration=1 sec. Threshold1=5). At step 607 logic circuitry 503 applies a second interference-mitigation technique when the count of common portion of the multiple, simultaneous transmissions that cannot be decoded, over a period of time, exceeds a Threshold2 (E.g., time duration=1 sec. Threshold2=8).

As discussed above, the multiple, simultaneous transmissions may comprise multiple, simultaneous registration/call requests, while the common portion may comprise a field taken from a group consisting of a sync field, a slot-type field, a color code field, a data type field, a frame synchronization field, and a network identifier field.

Additionally, the first interference-mitigation technique may comprise using a transmitter to transmit instructions to allow an inbound control channel access to a subset of Subscriber units, while the second interference-mitigation technique may comprise changing a frequency of the inbound control channel. There may exist multiple techniques for interference mitigation, however, typically two techniques are utilized. A first technique allows an inbound control channel access to a subset of subscriber units as mentioned. A second technique announces a longer "random Hold-off timer" that is applicable to all subscriber units at that site. This causes the subscriber units to "hold off" on any retransmission and hence will spread out transmissions from multiple subscriber units thereby reducing number of collisions on the inbound control channel.

In the foregoing specification, specific embodiments have been described. However, one of ordinary skill in the art appreciates that various modifications and changes can be made without departing from the scope of the invention as set forth in the claims below. For example, although a simultaneously-transmitted registration request/message was used to determine if a common portion could be decoded, any message may be utilized in a similar manner. Additionally, while various interference-mitigation techniques were described above, the specification is not meant to be limiting the invention to any particular type of interference mitigation. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for detecting interference within a communication system, the method comprising the steps of: using a radio-frequency receiver to receive multiple, simultaneous transmissions from a plurality of subscriber units; determining that a common portion of the multiple, simultaneous transmissions can be decoded, while a non-common portion of the multiple, simultaneous transmissions cannot be decoded; and applying an interference-mitigation technique that is based on whether the common portion of the multiple, simultaneous transmissions can be decoded, while the non-common portion of the multiple, simultaneous transmissions cannot be decoded; wherein the multiple, simultaneous transmissions comprise multiple, simultaneous registration or call requests, and wherein the common portion comprises a field taken from a group consisting of a sync field, a slot-type field, a color code field, a data type field, a frame synchronization field, and a network identifier field.

2. The method of claim 1 wherein the interference-mitigation technique comprises using a transmitter to transmit instructions to allow an inbound control channel access to a subset of Subscriber units, or adjusting a random hold-off timer of Subscriber Units.

3. A method for detecting interference within a communication system, the method comprising the steps of: using a radio-frequency receiver to receive multiple, simultaneous transmissions from a plurality of subscriber units; determining if a common portion of the multiple, simultaneous transmissions can be decoded, while a non-common portion of the multiple, simultaneous transmissions cannot be decoded; applying a first interference-mitigation technique when the common portion of the multiple, simultaneous transmissions can be decoded, and the non-common portion of the multiple, simultaneous transmissions cannot be decoded; and applying a second interference-mitigation technique when the common portion of the multiple, simultaneous transmissions cannot be decoded; wherein the multiple, simultaneous transmissions comprise multiple, simultaneous registration or call requests, and wherein the common portion comprises a field taken from a group consisting of a sync field, a slot-type field, a color code field, a data type field, a frame synchronization field, and a network identifier field.

4. The method of claim 3 wherein the first interference-mitigation technique comprises using a transmitter to transmit instructions to allow an inbound control channel access to a subset of Subscriber units, or adjusting a random hold-off timer of Subscriber Units.

5. The method of claim 4 wherein the second interference-mitigation technique comprises changing a frequency of the inbound control channel.

6. A base station comprising: a receiver receiving multiple, simultaneous transmissions from a plurality of subscriber units; and logic circuitry determining that a common portion of the multiple, simultaneous transmissions can be decoded, while a non-common portion of the multiple, simultaneous transmissions cannot be decoded and applying an interference-mitigation technique that is based on whether the common portion of the multiple, simultaneous transmissions can be decoded, while the non-common portion of the multiple, simultaneous transmissions cannot be decoded; wherein the multiple, simultaneous transmissions comprise multiple, simultaneous registration or call requests, and wherein the common portion comprises a field taken from a group consisting of a sync field, a slot-type field, a color code field, a data type field, a frame synchronization field, and a network identifier field.

7. The base station of claim 6 wherein the interference-mitigation technique comprises using a transmitter to transmit instructions to allow an inbound control channel access to a subset of Subscriber units or adjusting a random hold-off timer of Subscriber Units.

\* \* \* \* \*